United States Patent [19]
Redmond

[11] Patent Number: 5,740,700
[45] Date of Patent: Apr. 21, 1998

[54] HANDLEBAR HAND COVER

[76] Inventor: Steven A. Redmond, 17825 38th Pl. W., Lynnwood, Wash. 98037

[21] Appl. No.: 648,993

[22] Filed: May 17, 1996

[51] Int. Cl.⁶ .................................................. B62K 21/12
[52] U.S. Cl. ........................................... 74/551.8; 2/17
[58] Field of Search ............................. 74/551.8, 558, 74/558.5; 2/17; 280/304.3

[56] References Cited

U.S. PATENT DOCUMENTS

| D. 176,579 | 1/1956 | Kraver | 74/551.8 |
| 1,333,872 | 3/1920 | Overton | 74/551.8 |
| 2,344,545 | 3/1944 | Harder | 74/551.8 |
| 3,462,188 | 8/1969 | Edgar | 296/78.1 |
| 3,665,515 | 5/1972 | Sjostrom | 74/551.8 X |
| 4,141,567 | 2/1979 | Scott | 280/289 |
| 4,438,661 | 3/1984 | Cullen | 74/551.9 |
| 4,856,112 | 8/1989 | Effle | 2/59 |

FOREIGN PATENT DOCUMENTS

| 1115529 | 4/1956 | France | 74/551.8 |
| 456958 | 4/1950 | Italy | 74/551.8 |
| 505236 | 12/1954 | Italy | 74/551.8 |
| 6-144324 | 5/1994 | Japan | 74/551.8 |

*Primary Examiner*—Vinh T. Luong
*Attorney, Agent, or Firm*—Dean A. Craine

[57] ABSTRACT

A handlebar hand cover made of lightweight, flexible material and designed to fit over a handlebar's hand grip and protect the rider's hand and wrist when placed thereon. More specifically, the hand cover includes a water-proof outer shell with an internal cavity sufficiently large so that the rider can operate the brake lever or other controls located adjacent to the hand grip. The outer shell is made of top and bottom panels attached together along their front peripheral edges. The medial and lateral peripheral edges of the top and bottom panels are selectively attached together which enable the rider to remove his hand outward through the hand cover in an emergency or sudden stop. An optional insulating lining may be used to provide additional warmth. Also, an additional reflective surface may be attached to the outer shell of the hand cover to improve visibility.

8 Claims, 3 Drawing Sheets

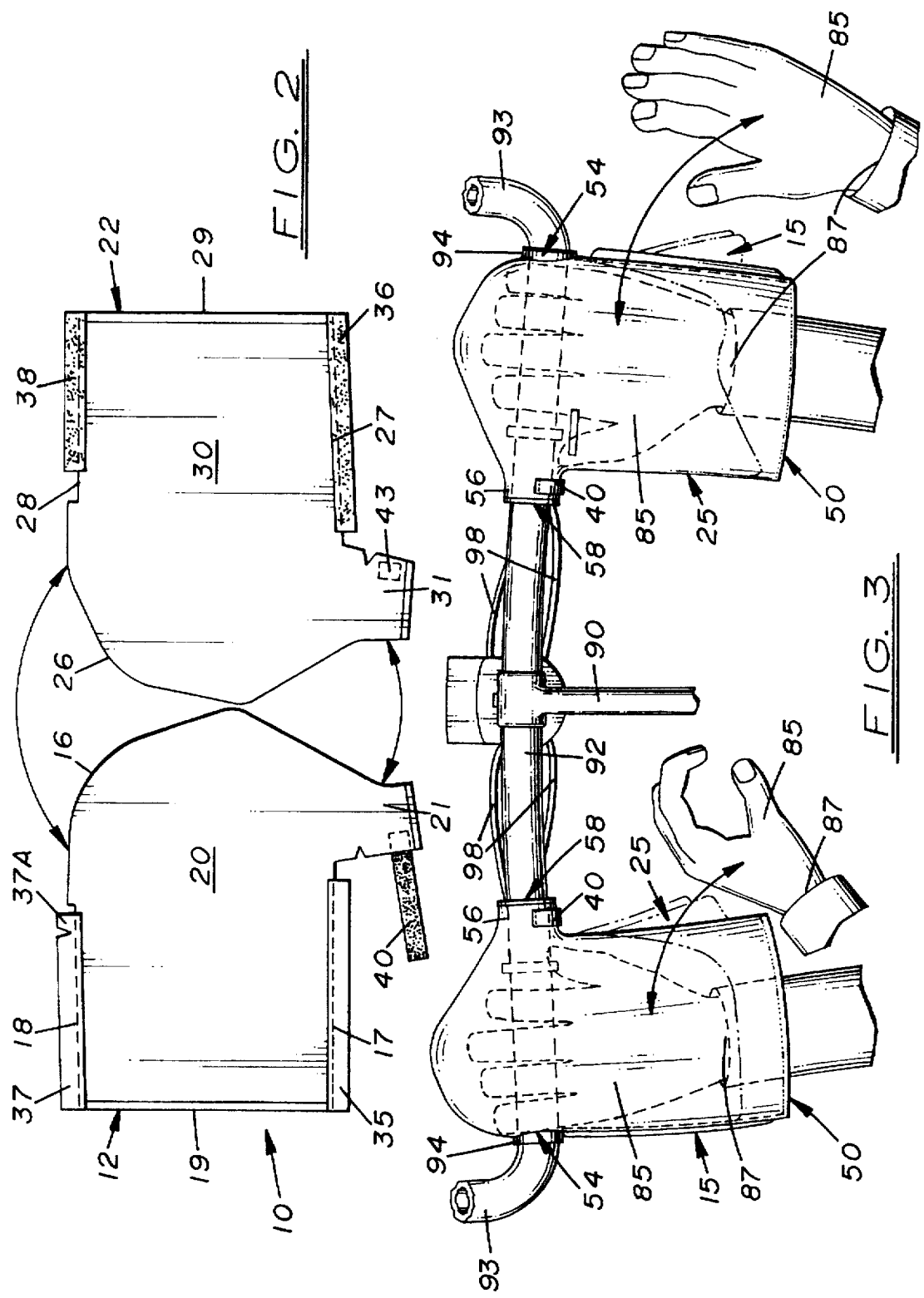

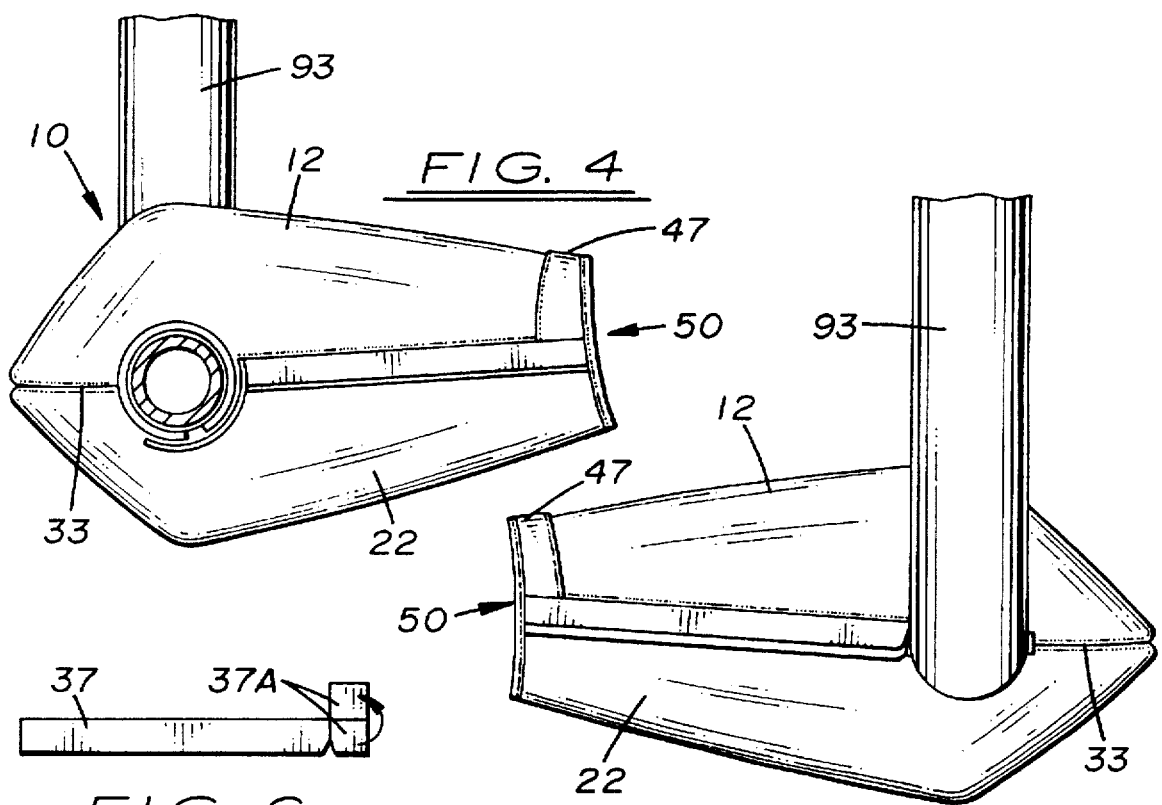
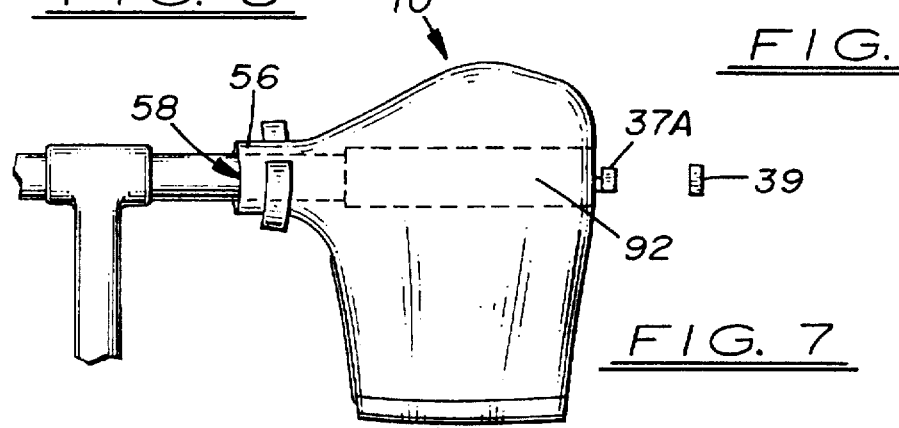
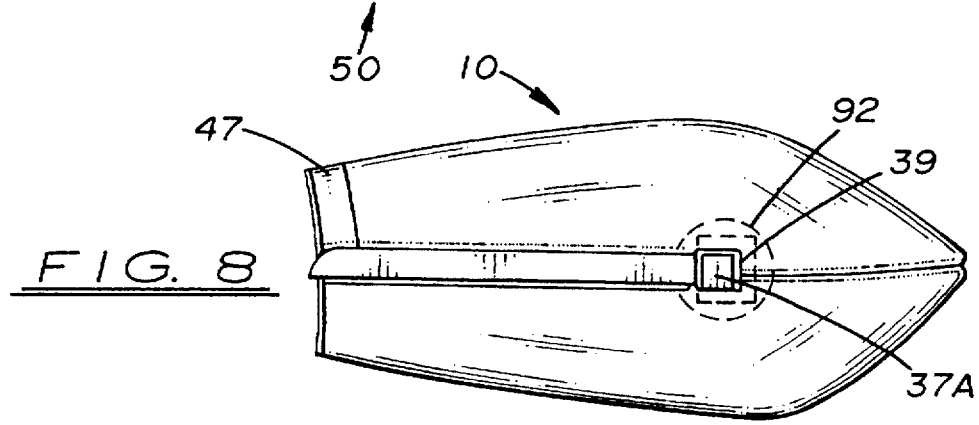

HANDLEBAR HAND COVER

BACKGROUND OF THE INVENTION

1. Field of the Invention

This invention relates to handlebar accessories, and, more particularly, to covers or protectors that attach over the ends of the handlebar to protect the user's hand.

2. Description of the Related Art

Many police departments use policeman to patrol assigned areas on bicycles. Unfortunately for the policeman, such patrols must be carried out regardless of weather conditions. Gloves are commonly worn by bicycle policeman to protect their hands and keep them warm and dry. During inclement weather conditions, such gloves become wet and cold which can be very uncomfortable and disabling.

A hand protector is needed that can be selectively attached to a variety of different handlebars on a bicycle which the policeman can use to keep his hands and gloves dry and warm when riding during inclement weather conditions. Ideally, such hand protectors should not only protect and keep the policeman's entire hand and wrist warm and dry, but also allow him or her to steer the bicycle and fully operate the hand brakes and gear shifter. Further, the hand protectors should also allow the policeman to quickly and easily remove his or her hands from the handlebar in the event of an emergency or accident.

Heretofore, hand guards made of rigid, plastic material, have been developed which attach over the ends of a straight handlebar on a bicycle to protect the rider's hands from impacting physical objects, (see U.S. Pat. No. 4,141,567). Such hand guards are affixed to the handlebar directly over the hand grips and bend rearward around the rider's hands. Unfortunately, such hand guards are rigidly affixed on the handlebars and do not adequately keep the rider's hands warm and dry during inclement weather conditions. Also, because these hand guards are rigid structures, they can cause serious injury to the rider if the hand guards strike an object when riding or if the rider is thrown over the handlebar in an accident.

SUMMARY OF THE INVENTION

It is an object of the invention to provide a hand cover which can be easily attached and removed from the ends of a bicycle handlebar which protects and keeps the rider's hand and wrist warm and dry when riding.

It is another object of the invention to provide such a hand cover which can be used on a variety of different handlebar designs and which allows the rider to fully operate the controls adjacent to the hand grip on the handlebar.

It is further object of the invention to provide such a hand cover that enables the rider to quickly and easily remove his or her hands therefrom.

It is a still further object of the invention to provide such a hand cover that is relatively inexpensive to manufacture.

These and other objects are met by providing a simple to use, economical to manufacture hand cover designed to be used over the handgrips of a bicycle's handlebar with or without bar extensions to protect and keep the rider's hand and wrist warm and dry when placed on the handgrip during inclement weather conditions. The hand cover is also designed to partially disengage from the handlebar so that the rider can quickly and easily remove his or her hands from the hand cover during an emergency or accident.

Each hand cover includes an outer shell made of flexible water-proof material which fits closely over a hand grip. A cavity is formed inside the outer shell which is sufficiently large so that the rider is able to steer the bicycle and operate the controls located near the handgrip, such as the hand brakes, gear shifter, etc. The outer shell has a closed front surface, a medial side opening, a lateral side opening, and a rear wrist opening. In the preferred embodiment, the outer shell includes a top panel and a bottom panel attached together along their curved, front edges to form a front seam. The lateral and medial edges of the top and bottom panels form the lateral and medial side openings into the outer shell which can be selectively closed by first and second releasable attachment means, respectively. During use, the first and second releasable attachment means releasably close the lateral and medial side openings.

Integrally formed on the outer shell between the front seam and the medial side opening on the outer shell is an extending neck section. The extending neck section is formed by aligning and registering the medial extending arm sections formed on the top and bottom panels. During assembly, the adjoining arm sections are attached together along their front edges and detached along their medial and rear edges. When installed on a bicycle, the outer cover is folded into an opened positioned, similar to a clam shell, so that the handlebar, cables and wires extend through the round medial opening located inside the extending neck section. The arm sections on the top and bottom panels are then wrapped around the handlebar. An optional neck attachment means is provided which enables the rider to selectively adjust the size of the medial opening to closely fit around the handlebar, wires, and cables to prevent water and cold air from entering the outer shell.

The outer shell also includes a bar extension opening formed near the lateral side opening. The bar extension opening enables a bar extension attached to the distal end of the handlebar to extend through the outer shell. The bar extension acts to hold the outer cover in position on the handlebar. When no bar extension is attached to the distal end of the handlebar, a bar extension opening closing means is provided for closing the bar extension opening to prevent water and cold air from entering the outer cover. An optional attachment means is also providing for attaching the outer cover to the distal end of the handlebar when no bar extension is used.

The first and second releasable attachment means located around the medial and lateral side openings enable the outer cover to fully open thereby allowing the rider to easily and quickly remove his or her hands from the outer shell by forcibly moving his or her hands outward therefrom. The first and second releasable attachment means are also designed to act as flap structures to partially shield the medial and lateral side openings to prevent water and cold air from entering the outer cover.

The wrist opening on the outer shell is sufficiently large so that the rider may extend his or her hand and wrist through the wrist opening to grasp the hand grip. Located inside the outer shell is an optional insulating lining to provide additional warmth. Also, an optional reflective surface may attached to the outside surfaces of the outer shell to improve nighttime visibility.

BRIEF DESCRIPTION OF THE DRAWINGS

FIG. 2 is a top plan view of a hand cover shown in an opened position before attaching the front edges of the top and bottom panels together.

FIG. 3 is a top plan view of two hand covers disposed over the handgrips on a bicycle showing the rider forcibly moving his hands out of the hand covers.

FIG. 4 is a medial, side elevational view of the hand cover used on a hand grip.

FIG. 5 is a lateral, side elevational view of the hand cover shown in FIG. 4.

FIG. 6 is a side elevational view of the loop connector pad 37 with a tab member 37A formed thereon showing it being folded out of position.

FIG. 7. is a top plan view of the hand cover placed over the end of a handlebar showing the tab member 37A being folded downward to cover the bar extension opening and attached to a hook pad connector 39 attached to the end of the handlebar.

FIG. 8 is a side elevational view of the hand cover shown in FIG. 7.

DESCRIPTION OF THE PREFERRED EMBODIMENT(S)

Figure 1:
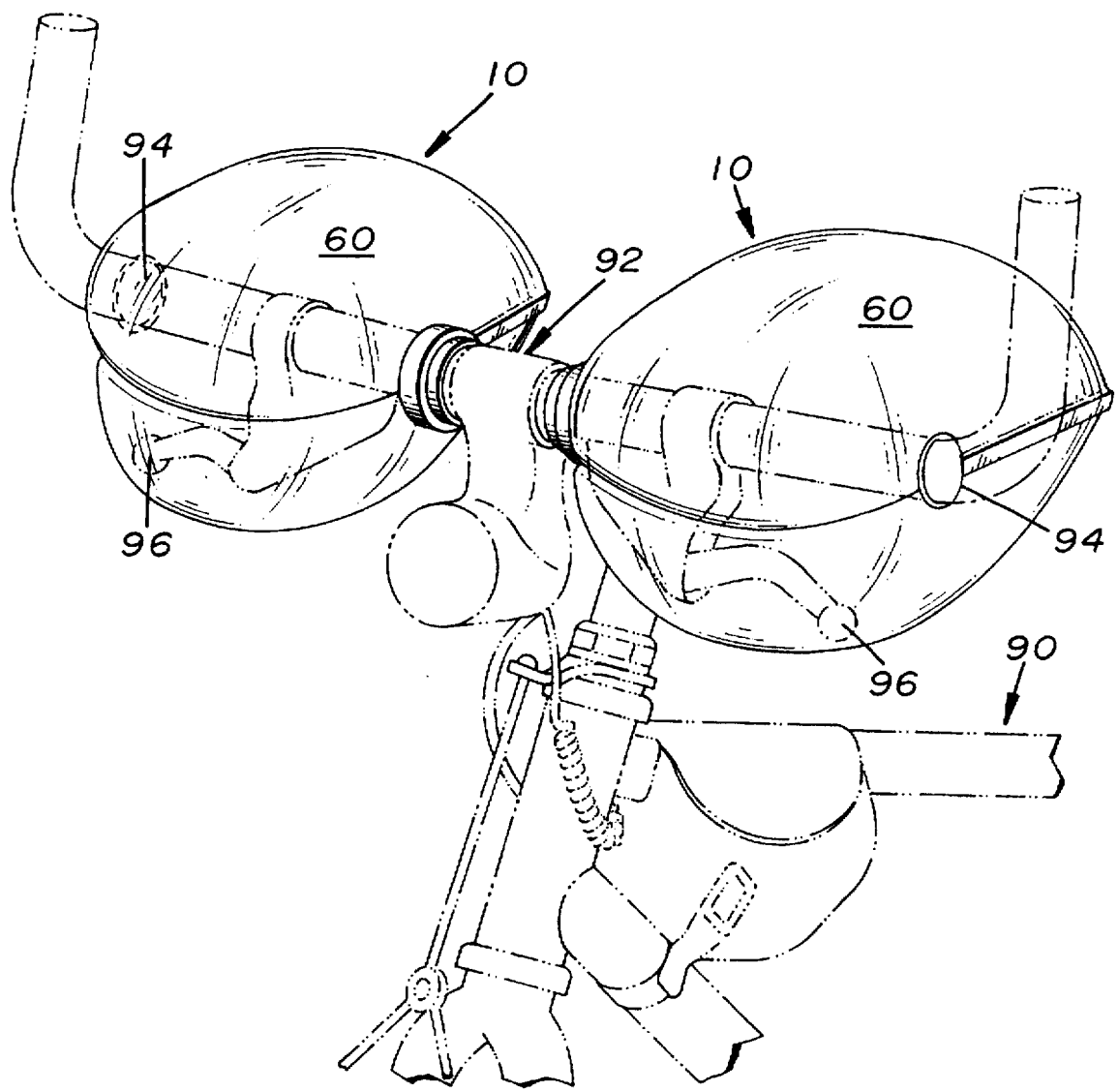
FIG. 1 is a perspective view of a pair of hand covers attached over the hand grips on a bicycle having a standard handlebar with bar extensions attached thereto.

Shown in the accompanying FIGS. 1–8, there is shown a hand cover, generally referred to as 10, used by a rider on a bicycle 90 designed to keep the rider's hands and wrists warm and dry when riding in inclement weather. Each hand cover 10 includes an outer shell 11 designed to sufficiently cover the bicycle's hand grip 94 and the rider's hand and wrist when placed therein. A cavity 60 is formed inside the outer shell 11 which is sufficiently large to cover the handgrip 94 and controls, such the brake lever's 96 or gear shift (not shown) located adjacent thereto and to allow the rider to steer the bicycle and operate the controls.

As shown more clearly in FIGS. 2–4, the outer shell 11 includes a top panel 12 and a bottom panel 22 made of flexibly, water-proof material sewn, glued or welded together along their curved front edges 16, 26, respectively to form a curved, front seam 33 thereon. In the preferred embodiment, the top and bottom panels 12, 22 are made of thin, durable polyester, vinyl or nylon material.

The registered medial edges 17, 27 and lateral edges 18, 28 of the top and bottom panels 12 and 22, respectively, are detached thereby forming lateral and medial side openings 15, 25, respectively, into the outer shell 11 shown more clearly in FIG. 5. A first and a second releasable attachment means are used to selectively close and seal the lateral and medial side openings 15, 25, respectively, during use. As shown more clearly in FIG. 2, the first releasable attachment means includes elongated loop and hook connector pads 35, 36 attached along one edge to the medial edges 17, 27 of the top and bottom panels 12, 22, respectively. The second releasable attachment means includes elongated loop and hook connector pads 37, 38 attached along one edge to the lateral edges 18, 28 on the top and bottom panels 12, 22 respectively. During installation on a handlebar, the top and bottom panels 12, 22 are aligned and registered so that the adjoining pairs of loop and hook connectors pads 35, 36 and 37, 38 may be interconnected to close the outer shell 11. The adjoining pairs of loop and hook connector pads are all attached along one edge to the adjacent edge of the panel which enables them to fold inward to fully cover the lateral and medial side openings.

As shown in FIG. 3, the first and second releasable attachment means are also designed to allow the top and bottom panels 12, 22 to be easily and quickly disengaged when the rider forcibly removes his or her hand 85 in any direction out of the hand cover 10. This feature is especially desirable to riders who may be required to suddenly depart from the bicycle during use, such as a policeman.

As shown in FIGS. 3 and 6, the outer shell 11 includes an extending neck section 56 with a medial opening 58 formed therein. Formed on each top and bottom panel 12, 22 is a medial extending arm section 21, 31, respectively. During assembly, the front edges of arm sections 21, 31, shown in FIG. 2, are sewn together while the medial and rear edges are detached. The extending neck section 56 is formed when the arm sections 21, 31 are aligned and registered around a handlebar. During installation on a handlebar, the wires and cables which connect to the controls adjacent to the hand grip and the central portion of the handlebar extend through the medial neck opening 58.

An optional, adjustable neck attachment means is provided which conforms and holds the neck sections 21, 31 in place around the handlebar 92 during use. In the embodiment shown, the neck attachment means includes an elongated strap member 40 attached at one end to the outside surface of the arm section 21 of the top panel 12. The strap member 40, made of loop connector material, is transversely aligned on the arm section 21 so that it may be wrapped around both arm sections 21, 31 when placed over the handlebar 92. A hook connector pad 43 is disposed between on the outside surface of the arm section 31 on the bottom panel 22 which selectively holds the strap member 40 in place around the arm sections 21, 31.

The forward portions of the lateral edges 18, 28 of the top and bottom panels 12, 22, respectively, are detached thereby creating a bar extension opening 54 into the cavity 60. When a bar extension 93 is attached to the distal end of the handlebar, it extends through the bar extension opening 54. In the preferred embodiment, the hook connector pad 38 is shorter than loop connector pad 37. The forward tab section of the loop connector pad 37, referred to a 37A, can be folded backwards as shown in FIG. 6. When the outer shell 11 is disposed over a handlebar and a bar extension 93 is inserted through the bar extension opening 54, the tab section 37A is folded upward out-of-the-way.

When no bar extensions are attached to the handlebar 92, as shown in FIGS. 7 and 8, the tab section 37A acts as a bar extension opening closing means. A hook connector pad 39 with an adhesive attached on one surface is attached to the distal end of the handlebar 92. The tab member 37A is folded downward over and connected to the hook connector pad 39 to securely attach the hand cover 10 in place over the handlebar. It should be understood that tab member 37A may be an extension of loop connector 37 or a separate element.

The rear edges 19, 29 of the top and bottom panels 12, 22 are detached thereby forming a wrist opening 50 which enables the rider to easily extend and remove his hand in a forward and rearward direction from the cavity 60. The size of the top and bottom panels 12, 22 is sufficient so that the rider's wrist is covered when the hand grips the handgrip. During use, water and air flowing over the top and bottom panels 12, 22 by-passes the rider's wrist falling either away from hand cover completely or onto the rider's forearm.

As further shown in FIG. 2, the inside surfaces of the top and bottom panels 12, 22, respectively, may be covered with an optional insulating lining 20, 30 to provide additional warmth. Also, an optional reflective surface 47 may attached to the outer surface of the top or bottom panels 12, 22 to improve nighttime visibility.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A handlebar cover for a handlebar having a hand grip and a bar extension, said cover comprising;
   a. an outer shell capable of surrounding a hand grip on a handlebar, said outer shell having a medial side opening, a lateral side opening and a bar extension opening formed therein, said medial side opening and said lateral side opening being disposed on opposite sides of said outer shell so that said outer shell may be disposed around a hand grip of a handlebar, said bar extension opening being disposed on said outer shell to allow a bar extension attached to said handlebar to extend through said outer shell, said outer shell having a wrist opening formed therein to allow an user to extend his hand into said outer shell and grab the hand grip;
   b. a first attachment means disposed along said medial side opening capable of selectively closing said medial side opening and allowing said medial side opening to open when the user's hand located inside said hand cover is forcibly extended through said medial side opening;
   c. a second attachment means disposed along said lateral side opening capable of selectively closing said lateral side opening and allowing said lateral side opening to open when the user's hand located inside said hand cover is forcibly extended therethrough, said lateral side opening; and,
   d. an inner lining attached inside said outer shell to provide additional warmth.

2. A handlebar cover, as recited in claim 1, wherein said first attachment means is a pair of hook and loop connector pads disposed along said medial side opening on said outer shell.

3. A handlebar cover, as recited in claim 1, wherein said second attachment means is a pair of hook and loop connector pads disposed along said lateral side opening on said outer shell.

4. A handlebar cover, as recited in claim 1, further including an extending neck section formed on said outer shell with said medial side opening formed therein through which the handlebar may be extended when said hand cover is attached over said handlebar.

5. A handlebar hand cover, as recited in claim 4, further including a neck section conforming means capable of adjusting the shape of said medial opening on said extending neck section to conform said extending neck section to said handlebar.

6. A handlebar hand cover, as recited in claim 5, further including reflective surface attached to said outer shell.

7. A handlebar hand cover, as recited in claim 5, further including a bar extension closing means capable of closing said bar extension opening when a bar extension is not extended therethrough.

8. A handlebar cover for a handlebar having a hand grip and a bar extension, said cover comprising;
   a. an outer shell capable of surrounding a hand grip on a handlebar, said outer shell having a medial side opening, a lateral side opening, and a bar extension opening formed therein, said medial side opening and said lateral side opening being disposed on opposite sides of said outer shell so that said outer shell may be disposed around the hand grip of a handlebar, said bar extension opening being disposed on said outer shell so that a bar extension attached to said handlebar can extend through said outer shell, said outer shell having a wrist opening formed therein to allow an user to extend his hand into said outer shell to grab the handlebar;
   b. an extending neck section formed on said outer shell with a medial opening formed therein through which the handlebar may be extended when said hand cover is attached over said handlebar;
   c. a first attachment means disposed along said medial side opening capable of selectively closing said medial side and allowing said medial side opening to open when the user's hand located inside said hand cover is forcibly extended therethrough;
   d. a second attachment means disposed along said lateral side opening capable of selectively closing said lateral side opening and allowing said lateral side opening to be opened when the user's hand located inside said hand cover is forcibly extended therethrough;
   e. a neck section conforming means capable of adjusting the shape of said medial opening on said extending neck section to conform said extending neck section to said handlebar;
   f. a bar extension opening closing means for selectively closing said bar extension opening when a bar extension is not inserted therethrough; and,
   g. a reflective surface attached to said outer shell.

* * * * *